Figure 1:
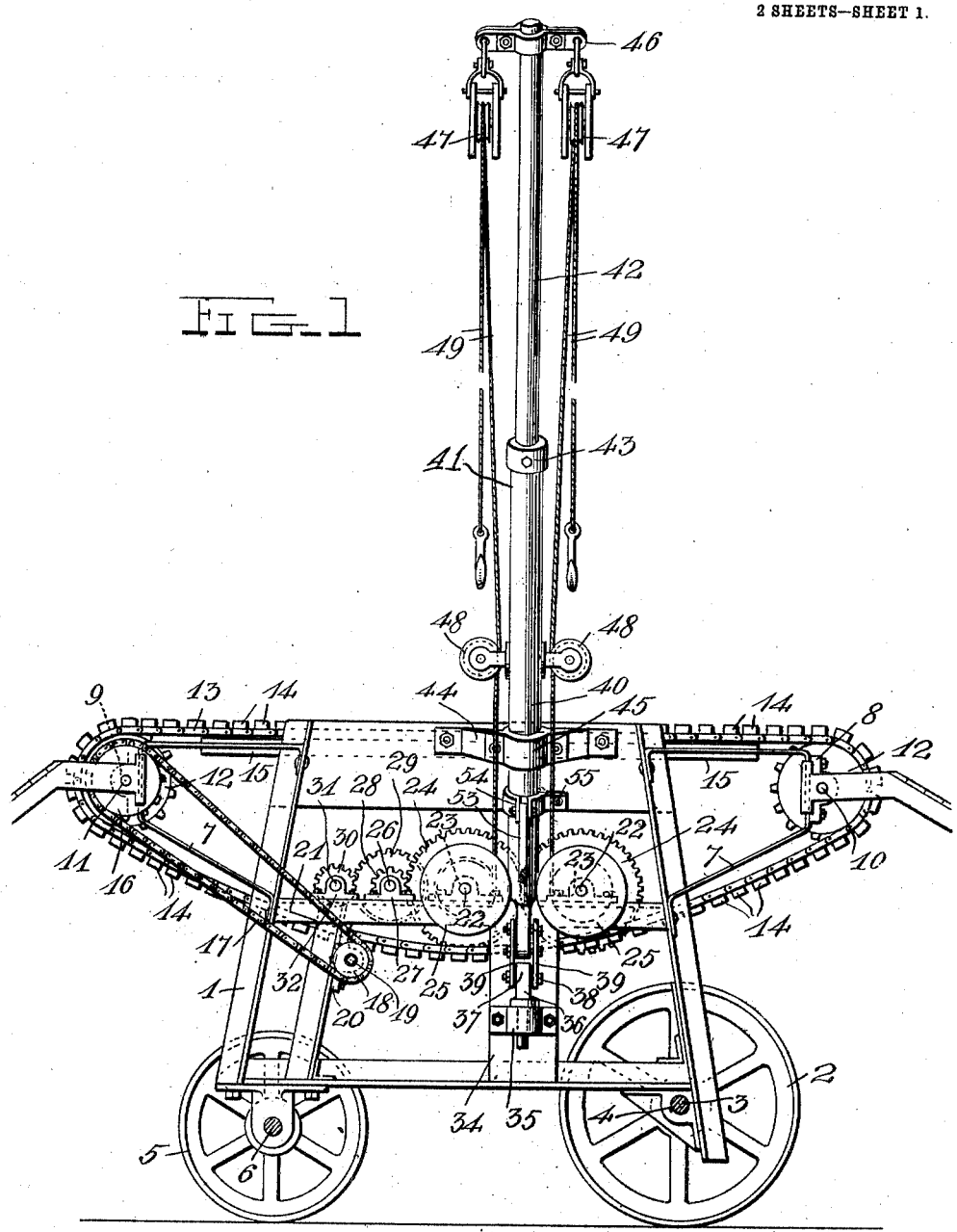

No. 817,350. PATENTED APR. 10, 1906.
P. TWOMEY.
TRUCK.
APPLICATION FILED DEC. 18, 1905.

2 SHEETS—SHEET 1.

Witnesses
C. Munroe
C. H. Griesbauer

Inventor
Patrick Twomey
by Benj. G. Cowl
Attorney

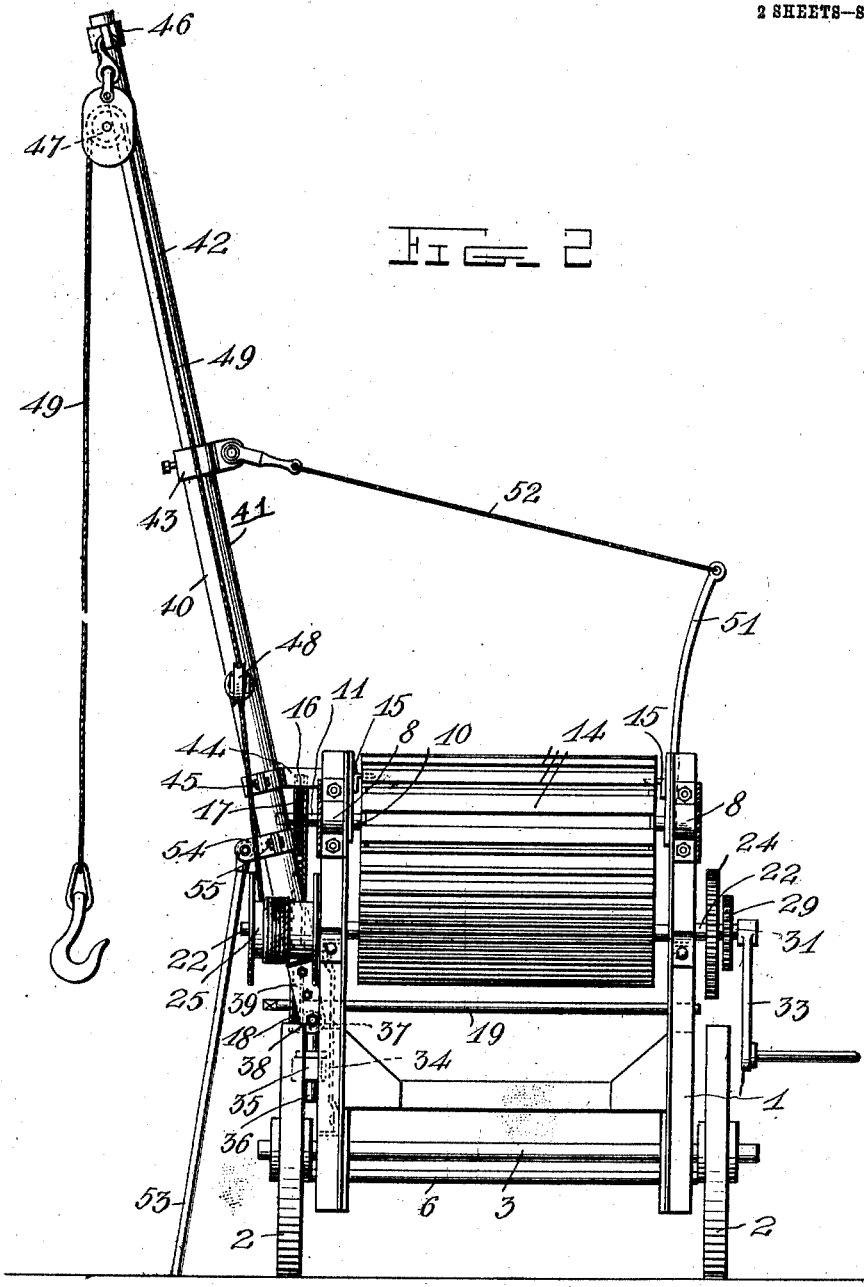

UNITED STATES PATENT OFFICE.

PATRICK TWOMEY, OF NEW YORK, N. Y.

TRUCK.

No. 817,350.      Specification of Letters Patent.      Patented April 10, 1906.

Application filed December 18, 1905. Serial No. 292,371.

*To all whom it may concern:*

Be it known that I, PATRICK TWOMEY, a citizen of the United States, residing at New York, in the county and State of New York, have invented new and useful Improvements in Trucks, of which the following is a specification.

My invention is an improved truck having a flexible endless traveling platform and further provided with a derrick by means of which commodities may be loaded on the truck; and it consists in the construction, combination, and arrangement of devices hereinafter described and claimed.

The present invention is an improvement on the truck described and claimed in my allowed application for Letters Patent of the United States, filed February 11, 1905, and numbered serially 245,244.

In the accompanying drawings, Figure 1 is a side elevation of my improved truck. Fig. 2 is an end elevation of the same.

The frame 1 of my improved truck is here shown as provided with rear supporting-wheels 2 on a fixed axle 3, journaled in bearings 4, and front supporting-wheels 5 on an axle 6. At the ends of the truck are brackets 7, provided, respectively, with bearings 8 9 for shafts 10 and 11. The said shafts are provided with sprocket-wheels 12, engaged by endless chains 13, which are connected together by cross-bars 14; said chains and bars comprising a flexible endless traveling platform the upper run of which is movable over guide and supporting ways 15, with which the truck-frame is provided. This endless traveling platform is more particularly described and is claimed in my copending application for Letters Patent of the United States. The shaft 11 is provided with a sprocket-wheel 16, connected by an endless sprocket-chain 17 to a similar wheel 18 on a shaft 19, which is journaled in bearings 20, with which the frame is provided and which may be turned by means of a suitable crank, so as to cause the endless traveling platform to be operated.

The sides of the frame are provided with horizontally-disposed bars 21. A pair of drum-shafts 22 are journaled in bearings 23 on the said bars 21 and are provided with intermeshing spur-gears 24 at one end and with drums 25 at the opposite end. A countershaft 26 is journaled in bearings 27 on said bars 21 and has a pinion 28, which engages one of said gears 24, and is also provided with a spur-gear 29, which is engaged by a pinion 30 on a power-shaft 31, which shaft is journaled in bearings 32 on said bars 21 and is provided with a crank 33, whereby it may be manually operated.

On the same side of the frame with the drums 25 is a vertical standard 34, which is here shown as bolted to said frame and to one of the bars 21. On the outer side of the said standard, near its lower end, is secured a block or bracket 35, which projects outwardly therefrom and is provided with a vertical opening for the reception of a pivot-pin 36. The said pivot-pin has an eye 37 at its upper end, through which passes a pivot-bolt 38, said bolt also passing through a pair of plates 39, which are bolted to the lower end of the lower member 40 of the derrick 41, the said derrick comprising the tubular lower member 40 and the tubular upper member 42, which is telescopically disposed in said member 40, is adjustable therein, and may be secured thereto at any desired adjustment by means of a suitable clamping-screw or other device 43.

The derrick is normally held in an inclined position by a bracket-arm 44, which is secured to and projects from one side of the truck-frame and is provided with a bolted outer member 45, which may be removed from said bracket-arm to release the derrick, so that the latter may be lowered and extended to a horizontal position to enable access to be readily attained to the derrick and facilitate the adjustment thereof. At the upper end of the upper member 42 of the derrick is a cross-arm 46. Pulleys 47 are suspended from the ends of the said cross-arm. Direction-pulleys 48 are mounted on opposite sides of the lower member of the derrick at a suitable distance above the truck-frame. The hoisting-tackles 49 pass over the pulleys 47 and engage the direction-pulleys 48, and their lower ends are attached to and reversely wound on the respective drums 25. It will be understood that said drums are simultaneously reversely rotated when the hand-crank 33 is turned so that the hoisting-tackles are simultaneously operated in the direction required to raise and lower a weight.

The truck-frame is provided on the side opposite the derrick with an upstanding arm or bracket 51. A guy 52 for the derrick is attached to said bracket or arm. It will be observed that the derrick inclines outwardly from one side of the truck-frame. To prevent it when hoisting a load from overturning the truck, I provide a supporting-leg 53, the upper end of which is here shown as pivoted to a collar 54, which is adjustable on the lower member of the derrick and is secured thereto at any desired adjustment by means of a screw or bolt 55, the lower end of the supporting-leg when the derrick is in use resting upon a floor or other surface on which the truck is placed. The said leg braces the derrick and the truck and prevents them from being overturned.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claims.

Having thus described my invention, what I claim as new, and desire to secure by Letters Patent, is—

1. A truck having a flexible endless traveling platform, a vertically-disposed pivot-pin mounted on one side of the truck, a bracket-arm projecting from the same side of the truck, and a derrick comprising a lower member and an upper member, the latter slidably connected to the lower member, said lower member being pivotally connected to the upper end of the pivot-pin and detachably secured to the bracket-arm and held thereby in an inclined position, said pivot-pin and the connection between the same and the lower member of the derrick adapting the derrick to be disposed in substantially a horizontal position and lowered from the truck.

2. A truck having a flexible endless traveling platform, a vertically-disposed pivot-pin mounted on one side of the truck, a bracket-arm projecting from the same side of the truck, a derrick having its lower portion pivotally connected to the said pivot-pin for movement in a vertical plane and detachably connected to the bracket-arm, and a supporting-leg having its upper end pivotally connected to the lower portion of the derrick, substantially as described.

In testimony whereof I have signed my name to this specification in the presence of two subscribing witnesses.

PATRICK TWOMEY.

Witnesses:
 RICHARD H. ARNOLD,
 LAMBERT G. MAPES.